(12) United States Patent
O'Leary et al.

(10) Patent No.: US 8,926,351 B2
(45) Date of Patent: Jan. 6, 2015

(54) BUSWAY JOINT PACK WITH HEAT SINK INSERT

(71) Applicant: Schneider Electric USA, Inc., Palatine, IL (US)

(72) Inventors: Timothy P. O'Leary, Antioch, TN (US); David O. Plummer, Murfreesboro, TN (US); Thomas P. McCrocklin, Nashville, IL (US)

(73) Assignee: Schneider Electric USA, Inc., Palatine, IL (US)

( * ) Notice: Subject to any disclaimer, the term of this patent is extended or adjusted under 35 U.S.C. 154(b) by 91 days.

(21) Appl. No.: 13/682,516

(22) Filed: Nov. 20, 2012

(65) Prior Publication Data

US 2014/0141636 A1    May 22, 2014

(51) Int. Cl.
  *H01R 4/60* (2006.01)
  *H01R 25/16* (2006.01)
  *H02G 5/00* (2006.01)

(52) U.S. Cl.
  CPC ............. *H01R 25/162* (2013.01); *H02G 5/007* (2013.01)
  USPC .......................................... 439/213; 174/68.2

(58) Field of Classification Search
  CPC ......... H02G 5/005; H02G 5/007; H02G 5/06; H02G 5/08
  USPC .............. 439/201–213; 174/68.2, 88 B, 99 B
  See application file for complete search history.

(56) References Cited

U.S. PATENT DOCUMENTS

| | | | |
|---|---|---|---|
| 4,174,143 A * | 11/1979 | Hicks et al. .................... | 439/213 |
| 4,627,680 A * | 12/1986 | Weimer et al. ................ | 439/210 |
| 4,673,229 A | 6/1987 | Jorgensen et al. | |
| 4,820,177 A | 4/1989 | Slicer | |
| 4,849,581 A * | 7/1989 | Larkin et al. ................. | 174/88 B |
| 4,950,841 A * | 8/1990 | Walker et al. ................ | 174/88 B |
| 5,122,072 A | 6/1992 | Arn et al. | |
| 5,828,006 A | 10/1998 | Graham et al. | |
| 5,854,445 A | 12/1998 | Graham et al. | |
| 6,146,169 A | 11/2000 | Calder et al. | |
| 7,819,681 B1 * | 10/2010 | Rodrigues et al. ............ | 439/213 |
| 7,862,356 B1 * | 1/2011 | O'Leary et al. ............... | 439/213 |
| 8,033,850 B2 * | 10/2011 | O'Leary et al. ............... | 439/213 |
| 8,163,998 B2 * | 4/2012 | Bhathija et al. ............. | 174/99 B |
| 8,177,569 B1 | 5/2012 | Dozier et al. | |
| 8,378,219 B2 * | 2/2013 | Lesieur et al. ............ | 174/129 B |
| 2009/0067131 A1 | 3/2009 | Yasuda et al. | |
| 2012/0113569 A1 | 5/2012 | Peralta et al. | |

FOREIGN PATENT DOCUMENTS

WO   WO 96/29768   9/1996
WO   WO 96/29769   9/1996

* cited by examiner

*Primary Examiner* — Thanh Tam Le
(74) *Attorney, Agent, or Firm* — Locke Lord LLP

(57) ABSTRACT

A busway joint pack includes a first connector plate and a second connector plate that is spaced from the first connector plate such that the connector plates are configured to engage a pair of phase-conductors of a pair of busway sections. The busway joint pack further includes a first insulator assembly and a second insulator assembly. Each of the insulator assemblies includes a heat sink and two electrically insulating sheets on either major side surface of the heat sinks. The insulator assemblies are positioned adjacent to the connector plates such that the insulating sheets electrically insulate the heat sinks from the connector plates. Side panels are positioned adjacent to the heat sinks and abut end surfaces thereof to aid in transferring heat generated in the busway joint pack to the surrounding environment via the heat sinks and side panels.

21 Claims, 5 Drawing Sheets

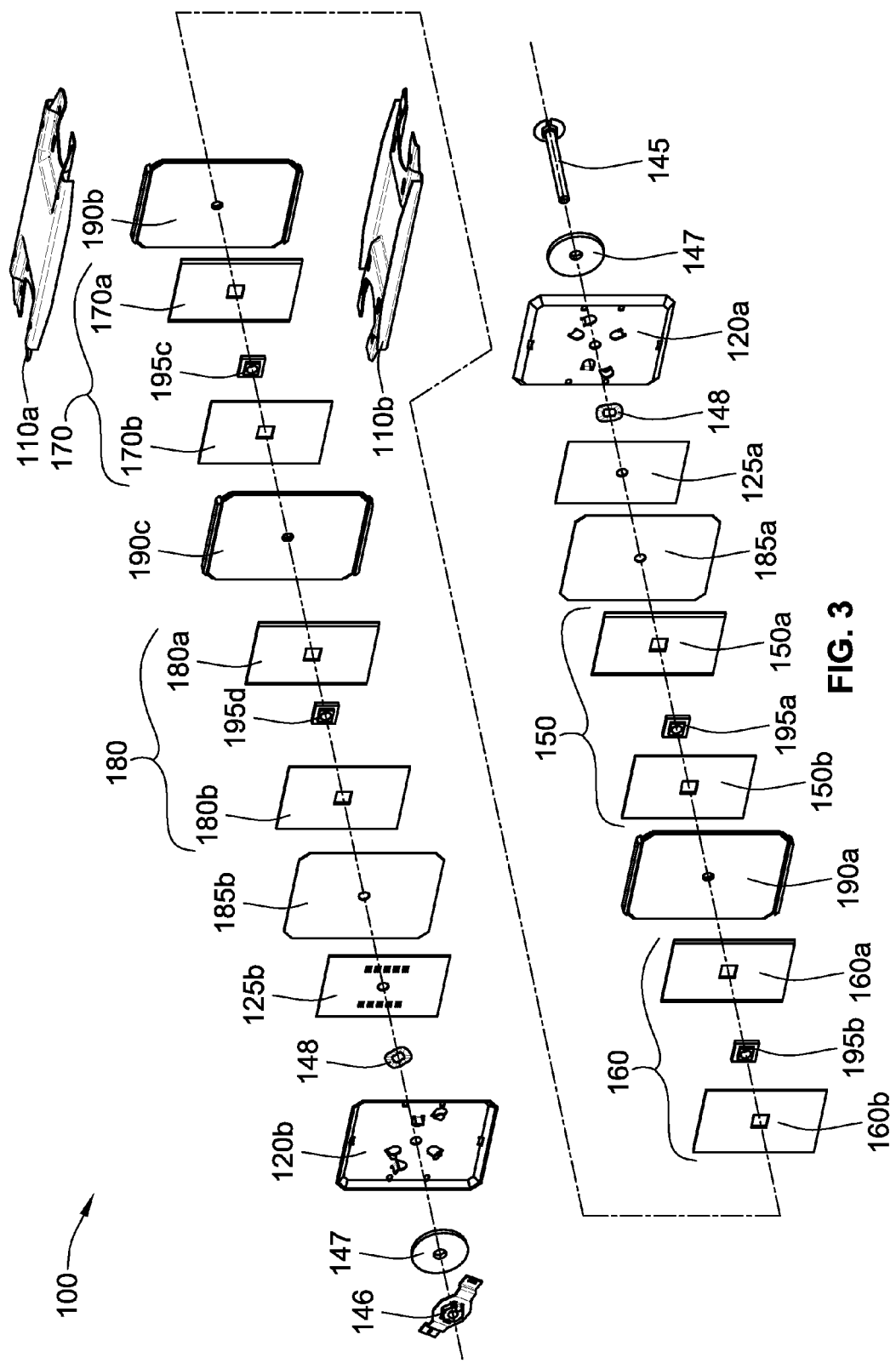

BUSWAY JOINT PACK WITH HEAT SINK INSERT

FIELD OF THE INVENTION

The present invention relates generally to electrical distribution equipment and, more particularly, to busway joint packs with heat sink inserts.

BACKGROUND OF THE INVENTION

A busway system typically includes two or more busway sections, one or more busway joint packs (e.g., electrical bus connectors) for connecting two busway sections together, and may include multiple plug-in units. Each busway section includes one or more phase-conductors and a housing. For example, in a three-phase system, the busway section can include three live phase-conductors or three live phase-conductors and one neutral-conductor, depending on the type of system architecture being employed. If required, various plug-in units or electrical components can be directly connected to one or more plug-in connection sites spaced along the busway sections to draw power. Each busway joint pack is used to physically and electrically connect two busway sections or two sets of busway together.

A common problem in busway systems is the management of the rise in temperature of the busway system within the busway joint pack. A rise in temperature within the busway joint pack limits the overall thermal performance of the busway system, which directly affects the required size of the busway sections and/or the size of the phase-conductors therein. Using larger phase-conductors to accommodate for the rise in temperature at the busway joint pack increases the size of, and accordingly the amount of, the materials needed to make the busway system. As phase-conductors are typically made of copper and/or aluminum, more copper or aluminum is needed. Another problem caused by the rise in temperature at the busway joint pack is a potential degradation of the busway system due to excessive heat, melting, deformation, etc.

Thus, a need exists for an improved apparatus and system. The present disclosure is directed to satisfying one or more of these needs and solving other problems.

SUMMARY OF THE INVENTION

The present disclosure is directed to providing a busway joint pack with a heat sink insert. The busway joint pack is configured to passively transfer thermal energy or heat from its core to an exterior housing such that the thermal energy is lost or transferred to the surrounding environment, which reduces the internal temperature of the joint pack. The busway joint pack includes a first connector plate and a second connector plate that is spaced from the first connector plate such that the connector plates are configured to engage a pair of phase-conductors of a pair of busway sections. The busway joint pack further includes a first insulator assembly and a second insulator assembly. Each of the insulator assemblies includes a heat sink and two electrically insulating sheets on either major side surface of the heat sinks. The insulator assemblies are positioned adjacent to the connector plates such that the insulating sheets electrically insulate the heat sinks from the connector plates. Side panels are positioned adjacent to the heat sinks and abut end surfaces thereof to aid in transferring heat generated in the busway joint pack to the surrounding environment via the heat sinks and side panels.

The foregoing and additional aspects and implementations of the present disclosure will be apparent to those of ordinary skill in the art in view of the detailed description of various implementations and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

FIG. 3 is a partially exploded perspective view of the busway joint pack of FIG. 2A.

DETAILED DESCRIPTION OF THE ILLUSTRATED EMBODIMENTS

Although the invention will be described in connection with certain aspects and/or implementations, it will be understood that the invention is not limited to those particular aspects and/or implementations. On the contrary, the invention is intended to cover all alternatives, modifications, and equivalent arrangements as may be included within the spirit and scope of the invention as defined by the appended claims.

Words of degree, such as "about", "substantially", and the like are used herein in the sense of "at, or nearly at, when given the manufacturing, design, and material tolerances inherent in the stated circumstances" and are used to prevent the unscrupulous infringer from unfairly taking advantage of the invention disclosure where exact or absolute figures and operational or structural relationships are stated as an aid to understanding the invention.

Figure 1:
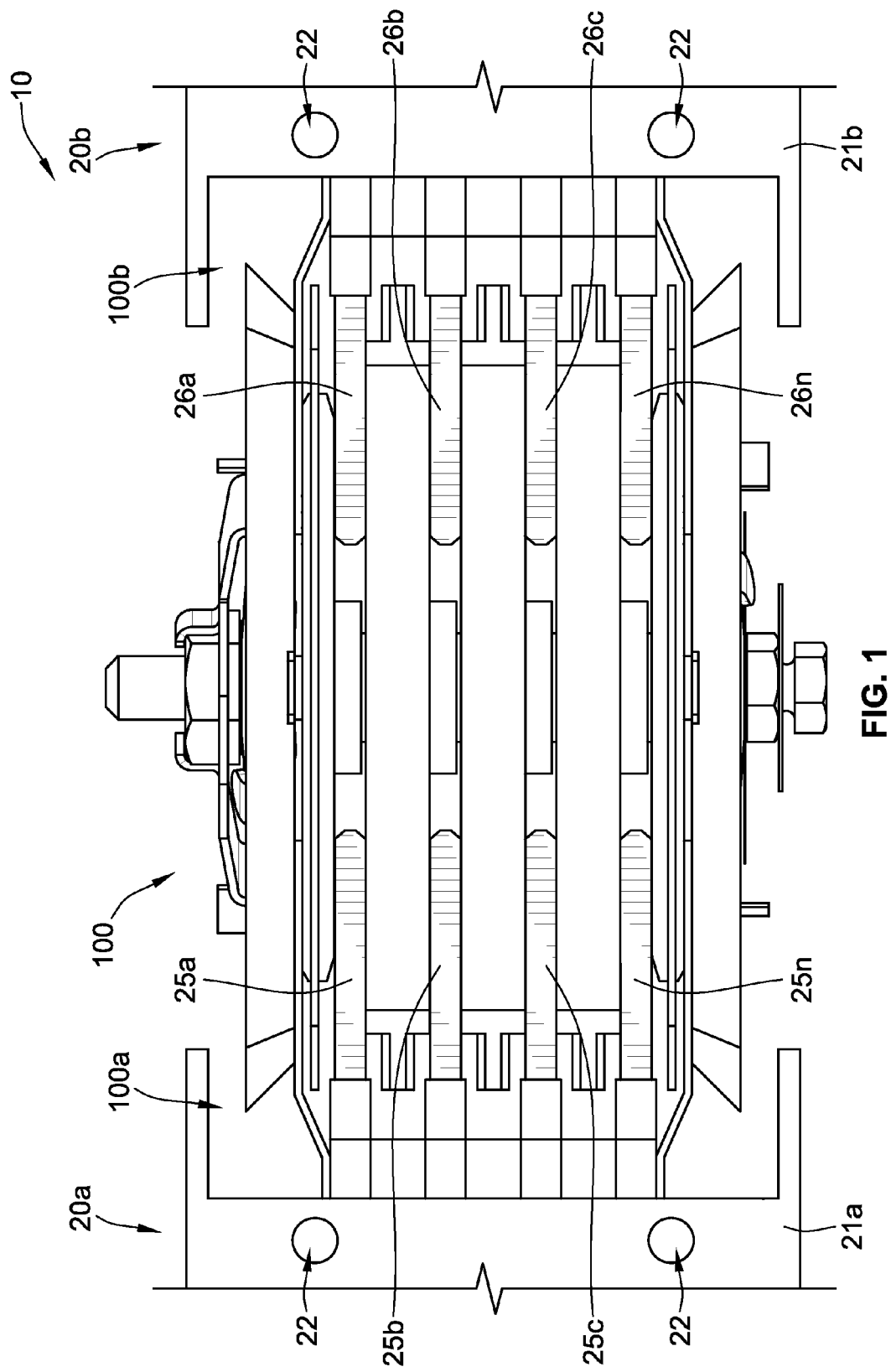
FIG. 1 is a partial side view of a busway system according to some aspects of the present disclosure.

Referring to FIG. 1, a busway system 10 is shown. The busway system 10 includes a busway joint pack or joint pack 100, a first busway section 20a, and a second busway section 20b. The first and the second busway sections 20a,b are four pole busway sections. Each of the busway sections 20a,b includes three phase-conductors and one neutral-conductor. The terms "busway" and "busway joint pack" as used herein have the meanings ascribed to them by persons of ordinary skill in the field of electrical distribution systems. A joint pack can also be referred to as an electrical bus connector. Generally, by the term "busway joint pack" or "joint pack" it is meant to include a collection of components that maintain a coupled relationship therebetween regardless of whether the busway joint pack is installed in a busway system or free floating waiting to be installed in a busway system. By free floating it is meant that the busway joint pack is not installed in a busway system (e.g., not coupled to two busway sections). By coupled relationship is meant that all of the components of the busway joint pack are coupled directly and/or indirectly to each of the other components of the busway joint pack regardless of whether the busway joint pack is installed or not installed in a busway system.

The first busway section 20a includes a busway housing 21a, three phase-conductors 25a-c, and one neutral-conductor 25n. A "phase-conductor" as used herein is an electrically conductive conductor that is capable of carrying electrical current having a phase, which can differ from a corresponding phase of another phase-conductor. Each of the phase-conductors 25a-c and the neutral-conductor 25n are electrically insulated from each other and the housing 21a. Each of the phase-conductors 25a-c and the neutral-conductor 25n have at least one exposed end configured to physically and electrically mate with a first end 100a of the busway joint pack 100, as shown in FIG. 1.

Similarly, the second busway section 20b includes a busway housing 21b, three phase-conductors 26a-c, and one neutral-conductor 26n. Each of the phase-conductors 26a-c and the neutral-conductor 26n are electrically insulated from each other and the housing 21b. Each of the phase-conductors 26a-c and the neutral-conductor 26n have at least one exposed end configured to mate with a second opposing end 100b of the joint pack 100 in the same manner as the three phase conductors 25a-c and the neutral-conductor 25n mate with the first end 100a.

The busway joint pack 100 is configured such that when the first busway section 20a and the second busway section 20b are both physically engaged with the joint pack 100, as shown in FIG. 1, the joint pack 100 electrically couples each of the three phase conductors 25a-c of the first busway section 20a with a respective one of the phase-conductors 26a-c of the second busway section 20b and the neutral-conductor 25n with the neutral-conductor 26n. Specifically, the first phase-conductor 25a of the first busway section 20a is electrically connected with the first phase-conductor 26a of the second busway section 20b; the second phase-conductor 25b of the first busway section 20a is electrically connected with the second phase-conductor 26b of the second busway section 20b; the third phase-conductor 25c of the first busway section 20a is electrically connected with the third phase-conductor 26c of the second busway section 20b; and the neutral-conductor 25n of the first busway section 20a is electrically connected with the neutral-conductor 26n of the second busway section 20b.

According to some alternative implementations, the busway sections 20a,b are three pole busways. In these alternative implementations, each of the busway sections includes three phase-conductors without a neutral-conductor (not shown).

Figure 2A:
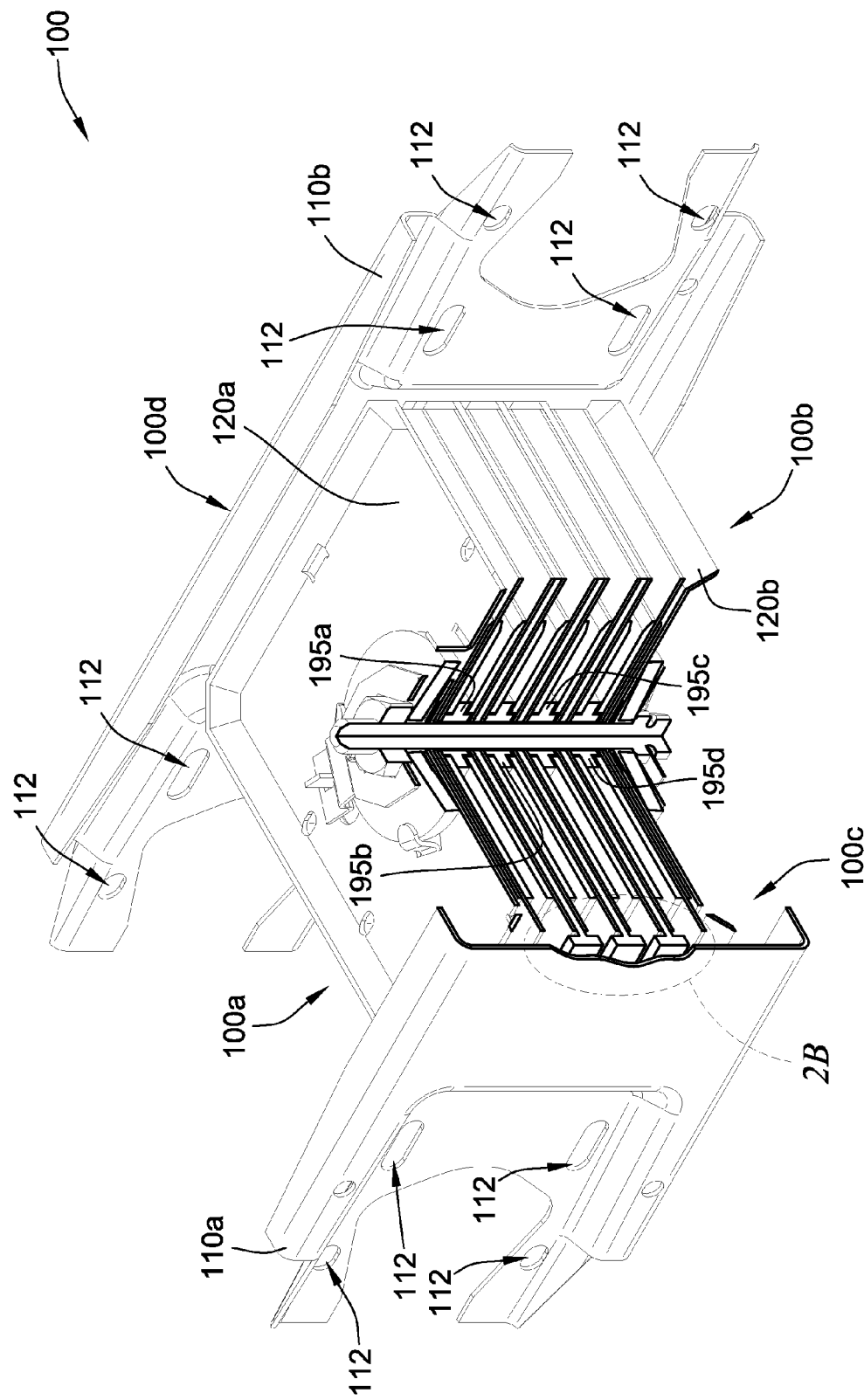
FIG. 2A is a partial cross-sectional perspective view of a busway joint pack of the busway system of FIG. 1 according to some aspects of the present disclosure.

Referring generally to FIGS. 1-3, the busway joint pack 100 is shown according to an exemplary implementation of the present disclosure. The joint pack 100 generally has the first end 100a (FIGS. 1 and 2A), the opposing second end 100b (FIGS. 1 and 2A), a first side 100c (FIG. 2A), and an opposing second side 100d (FIG. 2A). A top of the joint pack 100 is generally defined by a lid 120a, and a bottom of the joint pack 100 is generally defined by a base 120b.

As best shown in FIG. 2A, adjacent to the first side 100c of the busway joint pack 100 is a first side panel 110a and adjacent to the second opposing side 100d of the busway joint pack 100 is a second side panel 110b. The side panels 110a,b are also known as tie channels or as part of the housing of the joint pack 100 and/or of the busway system 10 (FIG. 1). As such, the side panels 110a,b aid in preventing access into an interior of the joint pack 100 when installed in the busway system 10.

The first and the second side panels 110a,b can be attached to the first and the second housings 21a,b (FIG. 1) of the first and the second busway sections 20a,b via screws, bolts, or similar fasteners. For example, each of the side panels 110a,b include apertures 112 (FIG. 2A) for receiving fasteners (not shown) therethrough to attach the side panels 110a,b to corresponding attachment locations 22 (FIG. 1) of the housings 21a,b of the first and the second busway sections 20a,b. Attaching the first and the second side panels 110a,b to the first and the second housings 21a,b electrically grounds the first and the second side panels 110a,b. The first and the second side panels 110a,b can be attached to the busway joint pack 100 (e.g., integral with one or more components of the busway joint pack 100) or positioned in the busway system 10 to abut at least a portion the busway joint pack 100 (e.g., to abut or touch the first and the second sides 100c,d of the busway joint pack 100 without being attached or integral therewith).

As best shown in FIG. 3, between the lid 120a and the base 120b, the busway joint pack 100 includes a pair of grounding plates 125a,b, four pairs of opposing connector plates 150, 160, 170, and 180, insulating plates 185a,b, insulator assemblies 190a-c, and four phase spacers 195a-d between respective ones of the pairs of opposing connector plates 150, 160, 170, and 180. These joint pack components are coupled together with a bolt 145 and a nut 146, which is best seen in FIG. 2A, although other fasteners are contemplated. Further, the joint pack 100 can include one or more washers 147 (e.g., Belleville washers) and/or one or more grounding spacers 148 positioned along the bolt 145.

While the joint pack 100 is shown as having a certain number, type, and size of components, various other numbers, types, and sizes of components are contemplated. For example, while the joint pack 100 is shown as including the four pairs of opposing connector plates 150, 160, 170, and 180, the joint pack 100 can include any number of pairs of opposing connector plates (e.g., one pair, two pairs, three pairs, etc.). Of course, as the number of pairs of connector plates change, the number of other joint pack components (e.g., insulator assemblies, phase spacers, etc.) is modified accordingly.

Each of the pairs of opposing connector plates 150, 160, and 170 corresponds to a particular electrical phase of the joint pack 100. The first pair of opposing connector plates 150 corresponds to phase A, the second pair of opposing connector plates 160 corresponds to phase B, and the third pair of opposing connector plates 170 corresponds to phase C of an electrical current (by convention, phases A, B, and C refer to different phases of electrical current, such as 120 degrees apart from one another). Further, the fourth pair of opposing connector plates 180 corresponds to neutral.

Each of the pairs of opposing connector plates 150, 160, 170, and 180 defines a respective space therebetween for receiving a phase-conductor of a busway, such as one of the phase-conductors 25a-c, 26a-c or one of the neutral-conductors 25n and 26n shown in FIG. 1. As best shown in FIG. 3, the first pair of opposing connector plates 150 includes a first connector plate 150a and a second connector plate 150b. Similarly, the second pair of opposing connector plates 160 includes a first connector plate 160a and a second connector plate 160b, the third pair of opposing connector plates 170 includes a first connector plate 170a and a second connector plate 170b, and the fourth pair of opposing connector plates 180 includes a first connector plate 180a and a second connector plate 180b.

The connector plates 150a,b, 160a,b, 170a,b, and 180a,b can be made of any electrically conducting material, such as, for example, copper, gold, aluminum, iron, etc. As best shown in FIG. 3, each of the connector plates 150a,b, 160a,b, 170a, b, and 180a,b has a first major surface, an opposing second major surface, a generally rectangular and substantially planar top profile, and an aperture therein. The apertures are generally positioned in a center of the connector plates 150a,

*b*, 160*a,b*, 170*a,b*, and 180*a,b* and are configured to receive one of the phase spacers 195*a-d* at least partially therein.

The pairs of connector plates 150, 160, 170, and 180 are held in a spaced-apart fashion, as best shown in FIG. 2A, by respective ones of the phase spacers 195*a-d*. Thus, when the phase-conductors 25*a-c* and 26*a-c* and the neutral-conductors 25*n* and 26*n* of the busway sections 20*a,b* are not coupled to the joint pack 100, the phase spacers 195*a-d* maintain a minimum space or distance between the first and the second connector plates for each pair of connector plates 150, 160, 170, and 180. Specifically, the first phase spacer 195*a* separates the first connector plate 150*a* from the second connector plate 150*b* of the first pair of connector plates 150 while maintaining a space for slidably engaging therebetween a phase-conductor (e.g., phase-conductors 25*a* and 26*a*). Similarly, the second phase spacer 195*b* separates the first connector plate 160*a* from the second connector plate 160*b* of the second pair of connector plates 160 while maintaining a space for slidably engaging therebetween a phase-conductor (e.g., phase-conductors 25*b* and 26*b*); the third phase spacer 195*c* separates the first connector plate 170*a* from the second connector plate 170*b* of the third pair of connector plates 170 while maintaining a space for slidably engaging therebetween a phase-conductor (e.g., phase-conductors 25*c* and 26*c*); and the fourth phase spacer 195*d* separates the first connector plate 180*a* from the second connector plate 180*b* of the fourth pair of connector plates 180 while maintaining a space for slidably engaging therebetween a neutral-conductor (e.g., neutral-conductors 25*n* and 26*n*).

As best shown in FIGS. 2A and 3, each of the phase spacers 195*a-d* includes a bore (not labeled) for receiving the bolt 145 therethrough. The bores of the phase spacers 195*a-d* aid in aligning and positioning the phase spacers 195*a-d* properly within the joint pack 100 such that the phase spacers 195*a-d* maintain a space or gap between the pairs of connector plates 150, 160, 170, and 180 when no phase-conductors or neutral-conductors are present or coupled to the joint pack 100. Maintaining such gaps aids in connecting the busway sections 20*a,b* to the joint pack 100 (e.g., the gaps provide a space for the phase-conductors 25*a-c* and 26*a-c* and the neutral-conductors 25*n* and 26*n* to enter the ends 100*a,b* of the joint pack 100).

The insulating plates 185*a,b* and the insulator assemblies 190*a-c* electrically insulate the A, B, and C phases and neutral from one another and from ground. In particular, the first insulating plate 185*a* and the first insulator assembly 190*a* electrically insulate phase A from the other phases and ground (e.g., grounding plate 125*a* and connector plate 160*a*). Similarly, the first and the second insulator assemblies 190*a,b* electrically insulate phase B from the other phases (e.g., connector plates 150*b* and 170*a*); the second and the third insulator assemblies 190*b,c* electrically insulate phase C from the other phases (e.g., connector plates 160*b* and 180*a*); and the third insulator assembly 190*c* and the second insulating plate 185*b* electrically insulate neutral from the other phases and ground (e.g., connector plate 170*b* and grounding plate 125*b*).

The insulating plates 185*a,b* can be made of any electrically insulating material, such as, for example, plastic/plastic material, rubber, MYLAR® (biaxially-oriented polyethylene terephthalate), polyvinyl chloride (PVC), bulk molded compound or thermoset, etc. Each of the insulating plates 185*a,b* has a generally rectangular cross-section, a generally rectangular top profile, and an aperture therein. The apertures of the insulating plates 185*a,b* are generally positioned in a center of the generally rectangular top profile of each insulating plate 185*a,b*. In particular, the apertures of the insulating plates 185*a,b* are sized and positioned to receive therethrough the bolt 145, or similar fastener to assemble the joint pack 100.

Figure 4:
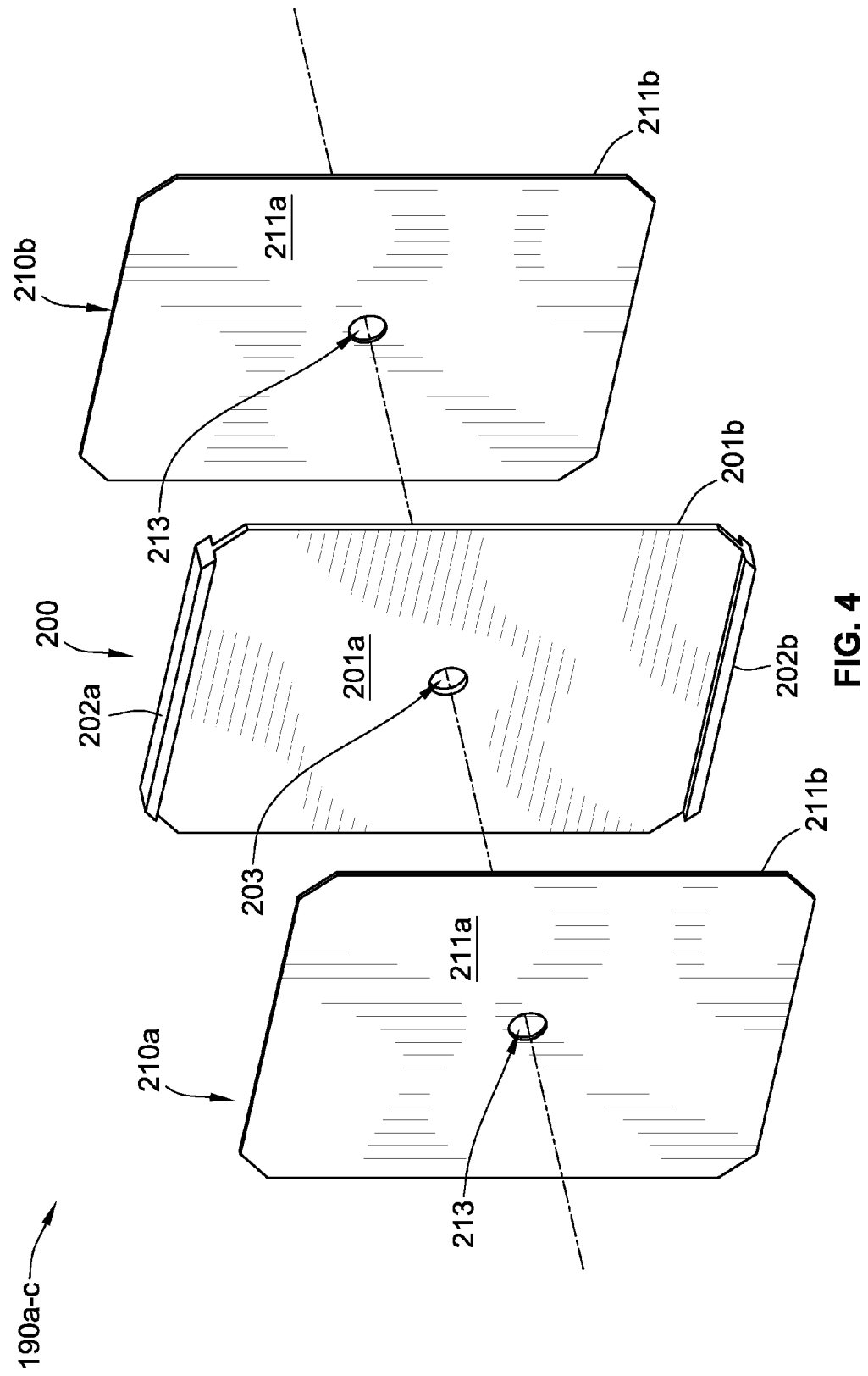
FIG. 4 is an exploded perspective view of an insulator assembly of the busway joint pack of FIG. 2A according to some aspects of the present disclosure.

Referring to FIG. 4, each of the insulator assemblies 190*a-c* (only one representative insulator assembly is shown) includes a heat sink 200 and a pair of electrically insulating sheets 210*a,b*. The heat sink 200 has a first major surface 201*a*, an opposing second major surface 201*b* (obscured), a first end surface 202*a*, an opposing second end surface 202*b*, and an aperture 203. The heat sink 200 can be made of any thermally conductive material, such as, for example, aluminum, copper, iron, etc.

Figure 2B:
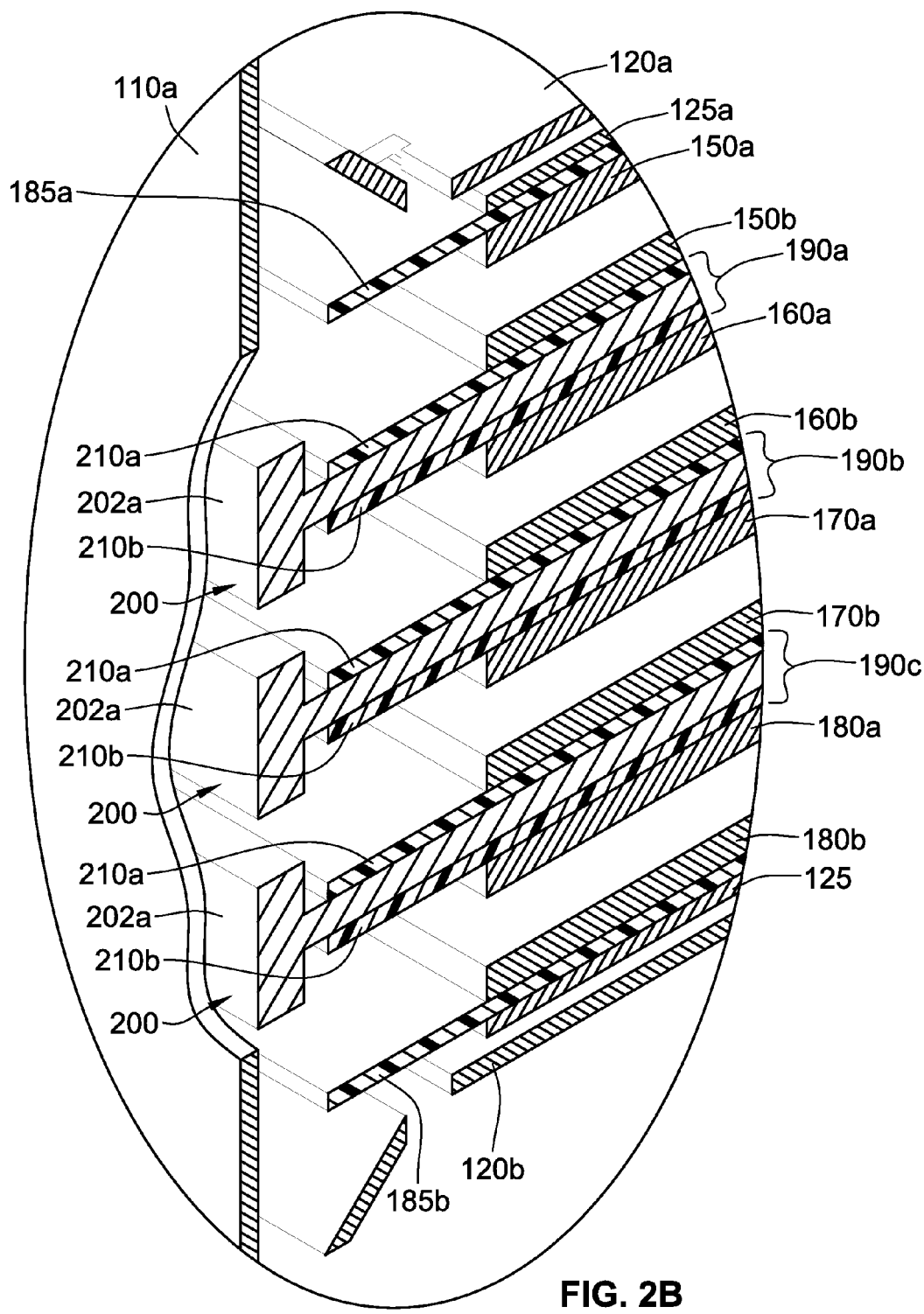
FIG. 2B is an enlarged view of a portion of the busway joint pack of FIG. 2A.

As shown in FIG. 4, the first and the second end surfaces 202*a,b* can be flanged end surfaces to increase a contact surface area between the heat sinks 200 of the insulator assemblies 190*a-c* and the first and the second side panels 110*a,b* (connection best shown in FIG. 2B). The first and the second flanged end surfaces of the heat sink 200 result in the heat sink 200 and the insulator assemblies 190*a-c* having a cross-section with a substantially "I" shape, although other cross-sectional shapes for the heat sink 200 and the insulator assemblies 190*a-c* are possible (e.g., "T" shape, "H" shape, etc.). Such an increased contact surface area can increase the heat transfer from the insulator assemblies 190*a-c*, particularly the heat sinks 200, to the first and the second side panels 110*a,b*. Such a transfer of thermal energy from the interior or core of the joint pack 100 to the first and the second side panels 110*a,b* can reduce an internal joint pack temperature, thereby improving the thermal performance of the busway system 10.

Each of the insulating sheets 210*a,b* has a first major surface 211*a*, an opposing second major surface 211*b* (obscured), and an aperture 213. The insulating sheets 210*a,b* can be made of any electrically insulating material, such as, for example, plastic/plastic material, rubber, MYLAR® (biaxially-oriented polyethylene terephthalate), polyvinyl chloride (PVC), bulk molded compound or thermoset, etc.

When the insulator assembly 190*a* is assembled (e.g., FIGS. 2A and 2B), the opposing second major surface 211*b* of the first insulating sheet 210*a* abuts and/or is attached (e.g., via glue, tape, etc.) to the first major surface 201*a* of the heat sink 200. Similarly, when the insulator assembly 190*a* is assembled (e.g., FIGS. 2A and 2B), the first major surface 211*a* of the second insulating sheet 210*b* abuts and/or is attached (e.g., via glue, tape, etc.) to the opposing second major surface 201*b* of the heat sink 200. Further, when the insulator assembly 190*a* is assembled (e.g., FIGS. 2A and 2B), the apertures 213 of the insulating sheets 210*a,b* align with the aperture 203 of the heat sink 200 to receive therethrough the bolt 145, or similar fastener to assemble the joint pack 100.

When assembled, the insulator assemblies 190*a-c* are positioned adjacent to the pairs of connector plates 150, 160, 170, and 180 such that the insulating sheets (e.g., insulating sheets 210*a,b*) electrically insulate the pairs of connector plates 150, 160, 170, and 180 from the heat sinks 200 of the insulator assemblies 190*a-c*. Such electrical insulation is necessary as the heat sinks 200 can be made of a metallic material (e.g., aluminum), which is electrically conductive. In particular, for example, the second insulating sheet 210*b* (FIG. 4) of the first insulator assembly 190*a* abuts the first major surface of the first connector plate 160*a* and electrically insulates the heat sink 200 (FIG. 4) of the first insulator assembly 190*a* from the first connector plate 160*a* of the second pair of connector plates 160. Similarly, for example, the first insulating sheet 210*a* (FIG. 4) of the first insulator assembly 190*a* abuts the second major surface of the second connector plate 150*b* and electrically insulates the heat sink 200 (FIG. 4) of the first insulator assembly 190a from the second connector plate 150b of the first pair of connector plates 150.

As best seen in FIGS. 2A and 2B, the insulator assemblies 190 a-c extend out to the first side 100c and the opposing second side 100d, respectively, of the joint pack 100. The extended positioning of the insulator assemblies 190a-c allows the first side panel 110a to engage (e.g., abut and/or touch) respective first end surfaces 202a (FIGS. 2B and 4) of the insulator assemblies 190a-c and the second side panel 110b to engage (e.g., abut and/or touch) respective second end surfaces 202b (FIG. 4) of the insulator assemblies 190a-c. As best shown in FIG. 2B, the first end surfaces 202a of the insulator assemblies 190a-c each engages an internal major surface of the first side panel 110a. In a similar manner, the opposing second end surfaces 202b of the insulator assemblies 190a-c each engages an internal major surface of the second side panel 110b.

While the three of the insulator assemblies 190a-c of the joint pack 100 are shown as being insulator assemblies and engaging the first and the second side panels 110a,b, it is contemplated that one or two of the insulator assemblies 190a-c can be an insulating plate instead. For example, in one such alternative implementation, only the second insulator assembly 190b engages the first and the second side panels 110a,b. In such an implementation, the first and the third insulator assemblies 190a,c are replaced with insulating plates (e.g., insulating plates 185a,b). Further, in another alternative implementation, more than the three insulator assemblies 190a-c are present. For example, in such an alternative, one or both of the insulator plates 185a,b can be replaced with an insulator assembly (e.g., insulator assemblies 190a-c).

Assembly of the joint pack 100 includes arranging the various components of the joint pack 100, as best shown in FIG. 3. The components are arranged and/or stacked in the following order from the lid 120a through the base 120b of the joint pack 100: the lid 120a, the first grounding plate 125a, the first insulating plate 185a, the first connector plate 150a of the first pair of connector plates 150, the first phase spacer 195a, the second connector plate 150b of the first pair of connector plates 150, the first insulator assembly 190a, the first connector plate 160a of the second pair of connector plates 160, the second phase spacer 195b, the second connector plate 160b of the second pair of connector plates 160, the second insulator assembly 190b, the first connector plate 170a of the third pair of connector plates 170, the third phase spacer 195c, the second phase connector plate 170b of the third pair of connector plates 170, the third insulator assembly 190c, the first connector plate 180a of the fourth pair of connector plates 180, the fourth phase spacer 195d, the second phase connector plate 180b of the fourth pair of connector plates 180, the second insulating plate 185b, the second grounding plate 125b, and the base 120b. Stacking the components in the preceding order automatically aligns respective apertures in each of the components such that the bolt 145 is slid through the common aperture positioned approximately at a center of the joint pack 100. The bolt 145 and the nut 146 can be tightened to secure the components together, thereby defining the respective spaces of each of the pairs of opposing connector plates 150, 160, 170, and 180 for slidably engaging therebetween a phase-conductor of a busway section (e.g., phase-conductors 25a-c, 26a-c or neutral-conductors 25n, 26n).

As described herein, the joint pack 100 can include washers 147 and/or grounding spacers 148 (FIG. 3). The washers 147 can be included in the stack of components as shown in FIG. 3. Tightening the bolt 145 and the nut 146 compresses the washers 147, which aids in distributing the compressive load of the bolt 145 and the nut 146, as well as, securing or locking the nut 146 in place to prevent an accidental loosening of the nut 146 during use of the joint pack 100 in the busway system 10. Additionally, the grounding spacers 148 can be included in the stack of components as shown in FIG. 3 to aid in providing a space between the grounding plate 125a and the lid 120a and between the grounding plate 125b and the base 120b for receiving respective portions of the housings 21a,b of the busway sections 20a,b, which is best shown in FIG. 1.

After the lid 120a and the base 120b, the grounding plates 125a,b, the pairs of opposing connector plates 150, 160, 170, and 180, the insulating plates 185a,b, the insulator assemblies 190a-c, and the phase spacers 195a-d are rigidly coupled via the bolt 145 and the nut 146, assembly of the joint pack 100 can continue with attaching the first side panel 110a to the first side 100c (FIG. 2A) of the joint pack 100. Similarly, the second side panel 110b can be attached to the opposing second side 100d (FIG. 2A) of the joint pack 100.

The side panels 110a,b are made from thermally conductive material. As such, the first and the second side panels 110a,b operate like extensions of and/or integral portions of the heat sinks 200 of the insulator assemblies 190a-c, which extract thermal energy and conduct the energy to an environment surrounding the busway system 10. The insulator assemblies 190a-c (particularly the insulating sheets 210a,b) electrically insulate the four pairs of connector plates 150, 160, 170, and 180 from the first and the second side panels 110a,b and the insulator assemblies 190a-c (particularly the heat sinks 200) transfer thermal energy and/or heat from the four pairs of connector plates 150, 160, 170, and 180 to the first and the second side panels 110a,b, which reduces the internal joint pack temperature. The reduction of internal joint pack temperature is based on a comparison of the joint pack 100 and an equivalently sized and configured joint pack that does not include any insulator assemblies with heat sinks as shown in FIGS. 1-4. The insulator assemblies 190a-c, positioned as shown in FIGS. 1-2B, result in a temperature reduction of the joint pack 100 of at least one degree Celsius. It is contemplated that the insulator assemblies 190a-c, positioned as shown in FIGS. 1-2B, result in a temperature reduction of the joint pack 100 between one degree Celsius and seven degrees Celsius, dependant upon the thickness, surface area, and thermal conductivity of the insulator assemblies 190a-c (particularly the heat sinks 200 and the first and the second end surfaces 202a,b of the heat sinks 200).

In some implementations, the busway housing 21a (FIG. 1) is positioned relative to the joint pack 100 such that attaching the first side panel 110a to the first and the second busway sections 20a,b causes the first side panel 110a to engage (e.g., abut or touch) the first end surfaces 202a (FIGS. 2B and 4) of the heat sinks 200 of the insulator assemblies 190a-c (FIG. 2B). Similarly, the busway housing 21b (FIG. 1) is positioned relative to the joint pack 100 such that attaching the second side panel 110b to the first and the second busway sections 20a,b causes the second side panel 110b to engage (e.g., abut or touch) the second end surfaces 202b (FIG. 4) of the heat sinks 200 of the insulator assemblies 190a-c (FIG. 2B). Positioning the first and the second side panels 110a,b to directly engage the insulator assemblies 190a-c aids in transferring thermal energy from the pairs of opposing connector plates 150, 160, 170, and 180 to the first and the second side panels 110a,b and then to the surrounding environment (e.g., ambient).

Generally referring to FIGS. 1 and 2B, an exemplary flow of heat generated in the busway joint pack 100 is described.

During operation of the busway system 10, heat is generated due to, for example, the flow of electrical current from the first busway section 20a through the busway joint pack 100, and to the second busway section 20b. The heat is generated at or near the physical engagement of the phase conductors 25a-c and 26a-c and the pairs of opposing connector plates 150, 160, and 170. Thus, for the heat generated in the B phase, the heat flows from the phase-conductors 25b and 26b through the connector plates 160a,b. Specifically, some of the generate heat flows upward through the first connector plate 160a and some of the generate heat flows downward through the second connector plate 160b. The heat then flows through the second insulating sheet 210b of the first insulator assembly 190a and the first insulating sheet 210a of the second insulator assembly 190b to the respective heat sinks 200. Then the heat flows through the heat sinks 200 of the first and the second insulator assemblies 190a,b to the first and the second side panels 110a,b, where the heat can dissipate into the ambient/surround air.

A reduction of internal joint pack temperature is advantageous at least because it improves the thermal performance of the busway system 10, which directly affects the size of the phase-conductors needed in the busway sections. Thus, an improvement of thermal performance of the busway system 10 allows for the use of phase-conductors having smaller cross-sectional areas and/or an overall smaller busway architecture. Smaller and/or lighter phase-conductors can significantly reduce the amount of needed materials and the cost of fabrication as many phase-conductors are made from relatively expensive metals, such as copper and/or aluminum. As such, even a small reduction in cross-sectional area of a phase-conductor can result in a reduction in cost of a busway system.

As described herein, inclusion of the insulator assemblies 190a-c in the busway joint pack 100 allows for the reduction in the size (e.g., thickness) of the connector plates 150a,b, 160a,b, 170a,b, and 180a,b. In some implementations, each of the connector plates 150a,b, 160a,b, 170a,b, and 180a,b of the busway joint pack 100 is about forty percent thinner as compared to connector plates in a prior joint pack without the insulator assemblies 190a-c (e.g., includes standard insulating plates like insulating plate 185a). Further, in some implementations, the insulator assemblies 190a-c have a relatively thicker thickness as compared with the insulating plates of prior busway joint packs without the insulator assemblies 190a-c such that the overall height of the busway joint pack 100 is substantially the same as the prior busway joint pack without the insulator assemblies without compromising the thermal and/or electrical performance of the busway joint pack 100. As such, the busway joint pack 100 can readily be installed and used in a busway system designed for use with the prior busway joint pack.

In addition to the insulator assemblies 190a-c providing improved thermal performance for the busway joint pack 100 as compared with prior busway joint packs without the insulator assemblies, the insulator assemblies 190a-c are relatively more durable as compared to the insulating plates of prior busway joint packs. In particular, the heat sinks 200 of the insulator assemblies 190a-c aid in reducing the likelihood of the insulator assemblies 190a-c breaking (e.g., snapping or cracking) during installation into and/or removal from a busway system.

As described herein and as shown in the FIGS. the heat sinks 200 of the insulator assemblies 190a-c are fully integrated in the busway joint pack 100. As such, no additional assembly steps are necessary as compared to the assembly of a prior busway joint pack. By the term "integrated," it is meant that the heat sinks 200 are sub-parts or sub-components of the insulator assemblies 190a-c. Put another way, the insulator assemblies 190a-c include layers. In particular, each of the insulator assemblies 190a-c includes three layers, which is best shown in FIG. 4. The top and the bottom layers are the insulating sheets 210a,b and the middle layer is the heat sink 200. The top and the bottom layers (e.g., the insulating sheets 210a,b) of the insulating assemblies 190a-c can abut and/or be attached (e.g., via glue or otherwise) to the middle layer 200 (e.g., the heat sink 200) of the insulating assemblies 190a-c.

The arrangement of the heat sinks 200 as being integral with the insulator assemblies 190a-c allows for the busway joint pack 100 to retain a very even force distribution applied by the bolt 145 and the nut 146 as compared with prior busway joint packs. Specifically, as the heat sinks 200 are in line with and/or stacked along the bolt 145, the compressive force exerted by the bolt 145 and the nut 146 on the components of the busway joint pack 100 are evenly distributed throughout.

While particular aspects, implementations, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A busway joint pack, comprising:
    a first connector plate having a first major surface opposing a second major surface;
    a second connector plate having a first major surface opposing a second major surface, the second connector plate being spaced from the first connector plate such that the second major surface of the first connector plate and the first major surface of the second connector plate are configured to engage a pair of phase-conductors of a pair of busway sections;
    a first insulator assembly having a first major surface opposing a second major surface and a first end surface opposing a second end surface, the first insulator assembly positioned adjacent to the first connector plate such that the second major surface of the first insulator assembly is configured to abut the first major surface of the first connector plate;
    a second insulator assembly having a first major surface opposing a second major surface and a first end surface opposing a second end surface, the second insulator assembly positioned adjacent to the second connector plate such that the first major surface of the second insulator assembly is configured to abut the second major surface of the second connector plate;
    a first side panel positioned adjacent to the first and the second insulator assembly and abutting the first end surfaces of the first and the second insulator assemblies on a first side of the busway joint pack; and
    a second side panel positioned adjacent to the first and the second insulator assemblies and abutting the second end surfaces of the first and the second insulator assemblies on a second side of the busway joint pack that opposes the first side of the busway joint pack.

2. The busway joint pack of claim 1, wherein the first insulator assembly includes a first integrated heat sink and the second insulator assembly includes a second integrated heat sink.

3. The busway joint pack of claim 1, wherein the first insulator assembly includes three layers, top and bottom layers being formed from an electrically insulating material and a middle layer being formed from an electrically and thermally conductive material.

4. The busway joint pack of claim 3, wherein the top and the bottom layers are attached to the middle layer.

5. The busway joint pack of claim 3, wherein the middle layer of the first insulator assembly abuts the first and the second side panels and the top and the bottom layers do not abut the first and the second side panels.

6. The busway joint pack of claim 3, wherein the top and bottom layers are made of a plastic material and the middle layer is made of a metallic material.

7. The busway joint pack of claim 6, wherein the middle layer is made of aluminum.

8. The busway joint pack of claim 1, wherein each of the first and the second side panels conduct heat from the first and the second insulator assemblies to ambient.

9. The busway joint pack of claim 1, wherein the first and the second end surfaces of the first and the second insulator assemblies are flanged end surfaces such that a cross-section of the first and the second insulator assemblies has a substantially "I" shape.

10. The busway joint pack of claim 1, wherein the first and the second side panels are configured to be attached to housings of the pair of busway sections.

11. A busway joint pack, comprising:
a first connector plate having a first major surface opposing a second major surface;
a second connector plate having a first major surface opposing a second major surface, the second connector plate being spaced from the first connector plate such that the second major surface of the first connector plate and the first major surface of the second connector plate are configured to engage a pair of phase-conductors of a pair of busway sections;
a first insulator assembly including a first heat sink having a first end surface opposing a second end surface, a first electrically insulating sheet, and a second electrically insulating sheet, the first electrically insulating sheet of the first insulator assembly being configured to abut a first major surface of the first heat sink and the second electrically insulating sheet of the first insulator assembly being configured to abut an opposing second major surface of the first heat sink, the first insulator assembly being positioned adjacent to the first connector plate such that the second insulating sheet of the first insulator assembly is configured to abut the first major surface of the first connector plate and electrically insulate the first heat sink from the first connector plate; and
a second insulator assembly including a second heat sink having a first end surface opposing a second end surface, a first electrically insulating sheet, and a electrically second insulating sheet, the first electrically insulating sheet of the second insulator assembly being configured to abut a first major surface of the second heat sink and the second electrically insulating sheet of the second insulator assembly being configured to abut an opposing second major surface of the second heat sink, the second insulator assembly being positioned adjacent to the second connector plate such that the first insulating sheet of the second insulator assembly is configured to abut the second major surface of the second connector plate and electrically insulate the second heat sink from the second connector plate.

12. The busway joint pack of claim 11, further comprising:
a first side panel positioned adjacent to the first and the second heat sinks and abutting the first end surfaces of the first and the second heat sinks on a first side of the busway joint pack; and
a second side panel positioned adjacent to the first and the second heat sinks and abutting the second end surfaces of the first and the second heat sinks on a second side of the busway joint pack that opposes the first side of the busway joint pack.

13. The busway joint pack of claim 12, wherein each of the first and the second heat sinks conduct heat from the first and the second connector plates to the first and the second side panels.

14. The busway joint pack of claim 11, wherein the first and the second heat sinks are made of aluminum.

15. The busway joint pack of claim 11, wherein the first and the second end surfaces of the first and the second heat sinks are flanged end surfaces such that a cross-section of the first and the second heat sinks has a substantially "I" shape.

16. The busway joint pack of claim 11, wherein the first and the second electrically insulating sheets of the first insulator assembly are attached to the first heat sink; and
wherein the first and the second electrically insulating sheets of the second insulator assembly are attached to the second heat sink.

17. The busway joint pack of claim 11, wherein each of the first and second heat sinks has a first end surface and a second end surface opposing the first end surface and extends from the first end surface to the second end surface, the first end surface of the first and second heat sinks being arranged adjacent to a first side panel, the second end surface of the first and second heat sinks being arranged adjacent to a second side panel.

18. A busway system, comprising:
a first busway section including a first housing with a first phase conductor at least partially therein;
a second busway section including a second housing with a second phase conductor at least partially therein; and
a busway joint pack positioned between the first and the second busway sections and being configured to operatively couple the first busway section to the second busway section, the busway joint pack including:
a first connector plate;
a second connector plate spaced from the first connector plate such that the first connector plate and the second connector plate are configured to engage the first and the second phase conductors of the first and the second busway sections;
a first insulator assembly configured to abut the first connector plate;
a second insulator assembly configured to abut the second connector plate;
a first side panel coupled to the first and the second housings of the first and the second busway sections on a first side of the busway joint pack such that the first side panel abuts a first end surface of the first insulator assembly and a first end surface of the second insulator assembly on the first side of the busway joint pack; and
a second side panel coupled to the first and the second housings of the first and the second busway sections on a second side of the busway joint pack such that the second side panel abuts a second end surface of the first insulator assembly and a second end surface of the second insulator assembly on the second side of the busway joint pack, the second side of the busway joint pack opposing the first side of the busway joint pack.

19. The busway system of claim 18, wherein the first insulator assembly includes a first integrated heat sink and the second insulator assembly includes a second integrated heat sink.

20. The busway system of claim 19, wherein the first integrated heat sink conducts heat from the first connector plate to the first and the second side panels; and wherein
the second integrated heat sink conducts heat from the second connector plate to the first and the second side panels.

21. The busway system of claim 19, wherein the first and the second integrated heat sinks each includes flanged end surfaces such that a cross-section of the first and the second integrated heat sinks has a substantially "I" shape.

* * * * *